April 21, 1970   C. M. SNYDER   3,508,000
PRESSURE SENSITIVE ARTIFICIAL LARYNX
Filed April 4, 1966   2 Sheets-Sheet 1

INVENTOR.
CALVIN M. SNYDER
BY
ATTORNEYS

April 21, 1970   C. M. SNYDER   3,508,000
PRESSURE SENSITIVE ARTIFICIAL LARYNX
Filed April 4, 1966   2 Sheets-Sheet 2

INVENTOR.
CALVIN M. SNYDER
BY

ATTORNEYS

United States Patent Office 3,508,000
Patented Apr. 21, 1970

3,508,000
PRESSURE SENSITIVE ARTIFICIAL LARYNX
Calvin M. Snyder, Box 42, Kittredge, Colo. 80457
Filed Apr. 4, 1966, Ser. No. 540,064
Int. Cl. G10l 1/10
U.S. Cl. 179—1
9 Claims

ABSTRACT OF THE DISCLOSURE

An apparatus and method for enabling a laryngectomee to speak understandably utilizes a sensor responsive to minute variations in air presure which is securely positioned in the dental structure of the user and is arranged to produce signals and transmit them electromagnetically to an external receiver. The signal is detected and amplified and a loudspeaker is employed to produce audible speech when the user produces such variations of pressure by movement of his vocal organs including the lips, tongue and soft palate.

---

This invention relates to a method and apparatus for enabling a person who has lost the use of his vocal cords to generate articulate and intelligible speech.

Various forms of apparatus have been provided heretofore to enable a person who has lost his vocal cords to communicate with others. Apparatus for producing intelligible speech without the use of vocal cords may be difficult to use effectively and may produce speech sounds which are difficult to understand by persons not familiar with the sounds produced by such apparatus. Some forms of such apparatus employ a sound or tone producing device located and arranged so that the sound may be modulated by the normal movements of the vocal organs including the lips, tongue and soft palate. In another speech producing system an operation is performed to enable the person to use his esophagus in the production of the required sounds. The effective use of this esophageal speech method requires a substantial period of instruction and practice and may prove very difficult for some persons to master. It is desirable to provide a simple and effective method and apparatus for generating articulate and intelligible speech for persons who have lost the use of their vocal cords. Furthermore, it is desirable that such apparatus be of a size and configuration for installation in a manner such that it does not interefer with the normal functions of chewing and swallowing or with the movements of the vocal organs. Accordingly it is an object of the present invention to provide an improved method for enabling persons having no vocal cords to generate articulate speech sounds.

It is another object of this invention to provide an improved speech generating apparatus for facilitating the generation of intelligible speech by persons who have no vocal cords.

It is another object of this invention to provide an improved apparatus for facilitating the generation of intelligible speech by persons having no vocal cords and which comprises components which may be utilized with minimum interference with the normal functions of the mouth and remaining vocal organs.

It is a further object of this invention to provide an improved apparatus for enabling a person who has no vocal cords to generate articulate and intelligible speech sounds and which comprises components of small size which may be located to have minimum effect on the person's appearance.

Briefly, in carrying out the objects of this invention in one embodiment thereof a small or miniature tuned inductance-capacitance circuit is mounted in a closed chamber of a size to fit in the space formerly occupied by a tooth in the upper jaw. The reactance of the circuit is varied by changes of the pressure of the air in the mouth and thereby varies the resonant or critical frequency of the circuit. The device is mounted in the tooth space in accordance with professional dental practice. The variation in pressure produced by the normal movement of the vocal organs is sufficient to operate the pressure sensitive device and produce variations in the characteristics of the electric circuit proportional thereto. An electromagnetic field is produced about the circuit by operation of a generating unit preferably mounted in one bow of a pair of glasses worn by the user.

A coil in the circuit of an oscillator in the generating unit produces the field and detects the variations in the field produced by the changes in the pressure sensitive tuned circuit. A superheterodyne circuit is employed to detect the audio modulations of the wave and supplies an audio amplifier provided with tone shaping circuits and produces corresponding audio tones by means of a speaker carried in a shirt pocket or other convenient location on the user. Power for the unit is supplied by a battery carried by the user with the amplifier and speaker. By using available miniaturization techniques very small and highly acceptable components may be provided.

Other embodiments include apparatus employing very small dry batteries which may be mounted in the mouth and energize a transmitter to actuate a receiver worn on the bow of the glasses. In another embodiment the required energy is supplied by radio transmission from an antenna worn on the shoulder of the user underneath his coat, the powered transmitter being carried in a convenient pocket in the user's clothing.

In all embodiments the invention provides for the transmission of signals from the mouth of the user by electromagnetic waves rather than by wired conductors, and effective use of the apparatus becomes possible without interference with the normal movement of the usable vocal organs. The pressure changes utilized by this method are those which are used in the normal production of speech sounds by a person having vocal cords and the apparatus makes possible the production of articulate and easily understood speech.

The features of novelty which characterize this invention are poined out with particularity in the claims annexed to and forming a part of this specification. The invention itself, however, both as to its organization and manner of operation together with further objects and advantages thereof may best be understood upon reference to the following description taken in connection with the accompanying drawings in which:

Figure 1:
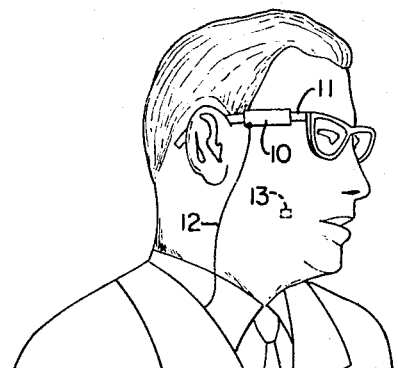
FIG. 1 is a perspective view representing a person using a speech aid embodying the invention.

Referring now to the drawing, FIG. 1 illustrates the head and shoulders of a person who is using an apparatus embodying the invention. This apparatus includes electronic signal detecting equipment 10 mounted on the bow 11 of a pair of glasses and connected through a two-wire cable 12 to an amplifier and speaker (not shown) and positioned suitably on the person's clothing. The signals translated by the equipment 10 are produced by a transducer located in a suitable position adjacent the upper jaw of the person as indicated generally by 13. The transducer as described below includes a main or body portion which is preferably mounted in a space formerly occupied by a tooth, the mounting of the device being accomplished in accordance with good professional dental practice.

The device 13 is sensitive to very slight changes in pressure within the mouth over a range of pressures within which lie the pressures existing during normal speech. When a person who has lost his vocal cords produces the normal speech movements of his remaining vocal organs including the lips, tongue and soft palate, the resulting variations in pressure produce a signal at the transducer 10. This signal corresponding to the normal pressure changes of speech is then utilized to produce variations in an electromagnetic field which encompasses the transducer 10 and the receiver 13. The signals are then detected and supplied to a suitable loud speaker. By employing compatible components in the electronic system and suitable tone shaping circuits, the sounds produced at the speaker may be made to correspond very closely to normal speech and are articulate and clearly intelligible.

The device constructed in accordance with this invention makes it possible for a person who does not have the use of his vocal cords to generate articulate speech, and the method of utilizing the device is easily learned by practice, the user being able to hear the speech as produced and, if necessary, to adjust his manner of speaking to effect the manner of use which gives him optimum speech results.

In order to provide an effective and easily controlled system it is essential that the transducer for producing electric signals corresponding to the variations in pressure of the mouth be highly sensitive, small in size, rugged and reliable in operation and be such that it can be mounted in the mouth in a manner similar to that of dental bridges and other forms of dentures.

Figure 2:
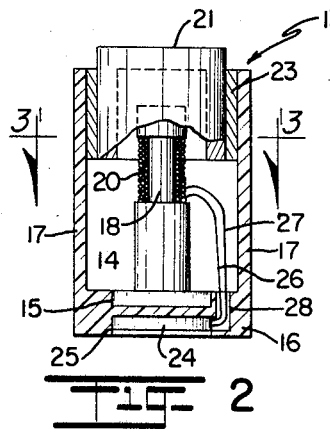
FIG. 2 is an enlarged sectional view of a transducer embodying the invention.
Figure 3:
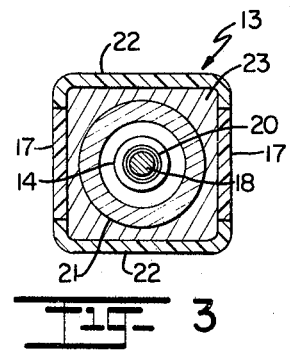
FIG. 3 is a sectional view along the line 3—3 of FIG. 2.

FIGS. 2 and 3 illustrate one form of such transducer which produces an electric signal corresponding to pressure variations by varying the inductance of a tunable inductance capacitance circuit. As illustrated in FIGS. 2 and 3 a magnetic core 14 mounted in a base 15 is carried on a rigid plastic base 16 having upwardly extending opposite side portions 17. The core 14 is provided with a portion 18 of reduced diameter forming a spool on which is provided an electric winding or coil 20 of fine gauge insulated electric wire. Over the upper end of the core 14 there is mounted a downwardly opening cup 21 of magnetic material which extends over a portion of the coil 20 and provides a shielding action. The space about the core 14 and below the cup 21 is completely closed by side portions 17 cooperating with two side panels 22 mounted on the oppostie sides of the square section of the transducer and having inturned end flanges sealed directly to the edges of the portions 17.

The cup 21 is sealed within the wall portions 17 and 22 by a mass of resilient plastic material 23 which is bonded to the cup 21 and to the wall members and completely seals the space below the cup from the atmosphere surrounding the transducer. The material 23 is sufficiently elastic to afford movement of the cup 21 in response to the pressure outside the transducer. Thus as the pressure is increased the cup moves downwardly and as it is decreased it moves upwardly.

A very slight movement of the cup is sufficient to effect a change in the inductance of the winding 20 and this change is reflected in the resonant frequency of the circuit which includes the inductance and a capacitor 24 mounted on the bottom of the cup in a recess 25, the coil 20 and the capacitor 24 being connected in series by leads 26 and 27 passing through an opening 28 in the bottom wall of the cup. This opening is sealed by the bonding and sealing of the capacitor 24 to the walls of the recess 25.

It will be understood that the transducer shown in FIGS. 2 and 3 has been very greatly enlarged for purposes of illustration and that in practice it is made sufficiently small to fit within the space formerly occupied by a tooth in the user's mouth. The mounting of the transducer adjacent the teeth is effected in accordance with good dental practice and in a manner such that the movement of the cup 21 will not be prevented or shielded during normal speaking movements of the tongue.

Figure 4:
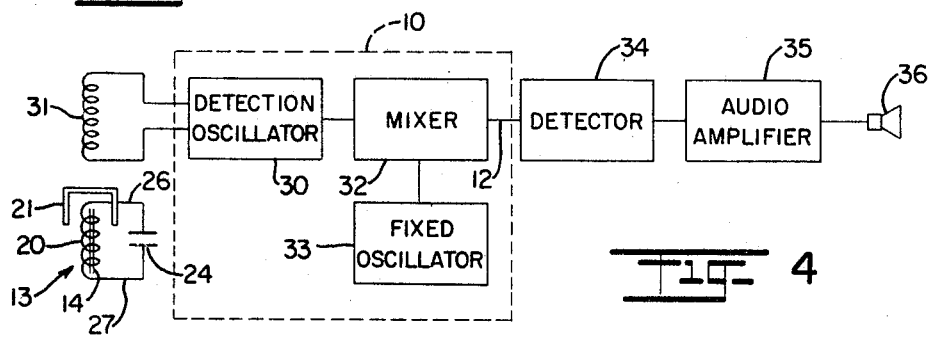
FIG. 4 is a block diagram of the circuit employed in the embodiment of FIG. 1.

The transducer as shown in FIGS. 2 and 3 is employed with an electronic circuit as shown in FIG. 4. In this application the transducer acts as a passive element, the energy for effecting the production of signals being provided by means of a detection oscillator indicated at 30 and which is provided with a coil 31 mounted within the unit 10 in inductive coupling proximity to the transducer 13 as indicated in the circuit. As indicated by the dotted rectangle, the detector oscillator 30 and a mixer 32 and fixed oscillator 33 are all mounted in the unit 10. These units may be of very small dimensions by employing the techniques of miniaturization now well known in the electronic art.

Power for operation of the circuit may be provided by batteries (not shown) which may also be mounted as a part of the unit 10 or may be provided by a single battery source arranged in a detector 34 and amplifier 35 which may be carried as a single unit in the clothing of the user and provided with suitable leads 12 to supply power to the unit 10.

The circuit comprising the inductance coil 20 and capacitor 24 is tuned to a predetermined frequency and the coil 31 together with a capacitor (not shown) in the circuit of the detection oscillator is tuned to the same frequency. Thereafter any changes in the resonant frequency of the transducer as produced by movement of the cup 21 will be detected because of the changes in the magnetic field produced thereby and these variations will appear as changes in current in the coil 31 and will be detected by the oscillator unit 30 and supplied to the mixer 32. The mixer is supplied with a fixed or intermediate frequency from the oscillator 33, the circuit being of the superheterodyne type, and the resulting difference frequency is supplied through the cable 12 to the detector and amplifier units 34 and 35, the audio or speech signals being reproduced by a speaker 36.

Figure 5:
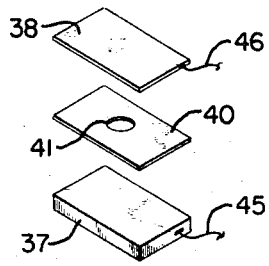
FIG. 5 is an exploded view of a portion of a modified form of transducer.

Other types of transducers may be employed which have the required characteristic of response to very small pressure variations. By way of example, in FIGS. 5 and 6 there is illustrated a transducer including a tuned circuit wherein the capacitance is variable rather than the inductance as in the transducer of FIG. 2. As shown in FIG. 5 this transducer comprises a base plate 37 and a top plate 38 which may be separated by a central plate 40 having a circular opening 41 in the center thereof and which is made of a suitable dielectric insulating material. The intermediate plate 40 is made of an insulating plastic material which is elastic and compressible. The three plates are bonded together to provide a unit indicated at 42 in FIG. 6 and which is secured to a supporting bow 43 on which an inductance coil 44 is wound.

The bow 43 may be constructed of insulating material and the coil 44 is connected by leads 45 and 46 to the plates 37 and 38, respectively. The capacitor 42 is rigidly secured to the bow 43 and the bow is shaped to the configuration of the teeth adjacent the space in which the capacitor 42 is mounted. The mounting of the capacitor 42 may be effected by providing suitable attachments (not shown) for engaging adjacent teeth and is mounted in a similar manner to that of the transducer of FIG. 2.

The bow 43 and coil 44 and the lower portions of the capacitor 42 may be embedded or potted in a suitable plastic material to provide adequate protection and a smooth outer surface so that it may be worn without irritation. The top plate 38 and the dielectric 40 may, by way of example, be of the order of 1/1000 inch in thickness and in lower base plate of the order of 1/100 inch. When the capacitor is in use the flexible characteristic of the upper plate causes it to flex over the opening 41 and thereby varies the capacitance of the unit 42 and thus the resonant frequency of the passive circuit comprising the capacitor 42 and the coil 44. This unit may be employed in place of the inductive unit 13 of FIGS. 2, 3 and 4.

Figure 7:
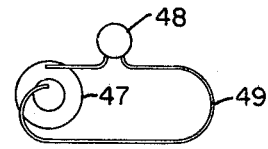
FIG. 7 is a side elevation view of another form of transducer.
Figure 8:
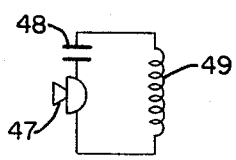
FIG. 8 is a schematic diagram of the circuit of the transducer of FIG. 7.

Another type of transducer which may be employed is illustrated in FIG. 7. This unit comprises a carbon button microphone 47, a capacitor 48, and an inductive loop 49 connected in series in the manner indicated diagrammatically in FIG. 8 and is tuned to the resonant frequency of the coil 31 when employed in the circuit of FIG. 4. The carbon microphone 47 is constructed to be responsive to the pressure within the mouth and the resistance thereof varies accordingly. This varies the current within the series circuit and thus the effect of the circuit in the inductive field produced by the coil 31. It thereby changes the load on the coil 31 resulting from the inductive coupling of the two circuits.

Figure 9:
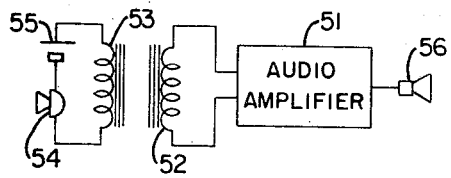
FIG. 9 is a circuit diagram of another embodiment of the invention.

The circuits as illustrated above employ a passive transducer mounted within the mouth. However, particularly because of the very small sizes in which dry batteries are available, a very small powered transmitter may be provided which can be fitted within the mouth in a manner similar to the transducers of the foregoing embodiments. FIG. 9 illustrates a simple circuit arrangement wherein an audio amplifier 51 having an inductance coil 52 in its input circuit is coupled to an inductance coil 53 which is connected in series with a carbon microphone 54 and a dry cell 55.

The microphone 54 is constructed to be sensitive to the pressure within the mouth and varies the current in the series circuit accordingly. These variations are thus transferred by inductance to the coil 52 and the audio amplifier reproduces the signals and suppplies them to a speaker 56. The microphone is of the carbon grain type, the circuit passing through the grains which are packed to completely fill a chamber formed in an insulating body having a diaphragm at one side and a base connection at the other. The diaphragm position varies with the pressure and changes the pressure on the carbon grains and hence the resistance path through them in a manner essentially the same as that employed in telephone transmitters. In this embodiment of the invention the coils 52 and 53 are inductively coupled, the coil 52 being within range of the field produced by the coil 53.

Figure 6:
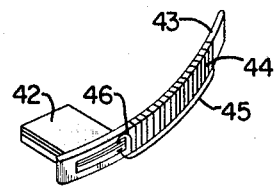
FIG. 6 is a perspective view of the device of FIG. 5 in its assembled position on the transducer.
Figure 10:
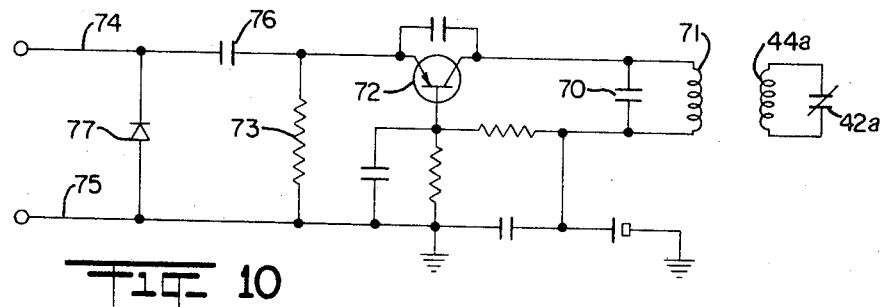
FIG. 10 is a circuit diagram of a further embodiment of the invention.

Another type of circuit which is useful for the purposes of this invention is illustrated in FIG. 10. This circuit represents a signal receiving unit for operation with one of the passive elements mounted within the mouth such as illustrated by the devices of FIGS. 2 and 6. A passive device of the type illustrated in FIG. 6 is indicated as comprising a variable capacitor 42a and an inductance coil 44a. The circuit of FIG. 10 operates in the manner of a grid dip oscillator and comprises a tuned circuit including a capacitance 70 and an inductance 71 connected in the collector circuit of a transistor 72, the output or emitter circuit of which includes a resistance 73 coupled to output leads 74 and 75 through a capacitor 76 across a diode 77 which acts as the detector of an audio amplifier (not shown but which is connected across the leads 74 and 75).

The tuned circuit including the capacitor 70 and the coil 71 is tuned to the frequency of the passive circuit comprising the capacitor 42a and coil 44a, and whenever the capacitance 42a is changed in accordance with the changes of pressure in the mouth, current flows in the grid circuit of the transistor 72 in proportion thereto and provides a signal which when shaped and amplified produces articulate tones determined by the movements of the speech organs of the user.

Figure 11:
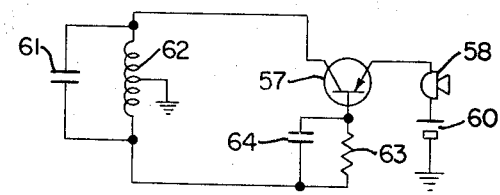
FIG. 11 is a circuit diagram of a still further embodiment.

In FIG. 11 there is illustrated a miniaturized radio transmitter which may be mounted within the mouth of a manner similar to the transducers heretofore described. This transmitter comprises a transistor 57 of the PNP type having a pressure sensitive microphone 58 mounted in series with a supply battery 60 in the emitter circuit and a tuned output circuit comprising a capacitor 61 and a tapped inductance 62 connected in the collector circuit. The common base circuit of the transistor 57 includes a resistance 63 and a capacitor 64 connected in parallel. The output circuit may be tuned to a frequency of, say, one megacycle and the coil 62 acting as an antenna will transmit a one megacycle wave modulated by the signals produced by the variations of the resistance of the microphone 58. These signals then are picked up by a receiving unit mounted adjacent the outside of the mouth as exemplified by the receiver 10 in FIG. 1.

Figures 12, 13:
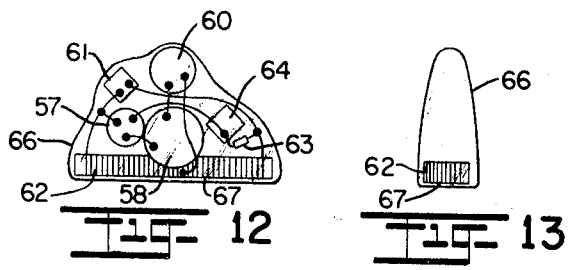
FIGS. 12 and 13 are side and front elevation views, respectively, of the transducer and system of FIG. 11.

The physical arrangement of the transmitter of FIG. 11 assembled for mounting in the mouth of the user is shown in FIGS. 12 and 13. As shown in these figures all of the components of the circuit are mounted or "potted" together in a mass of plastic material indicated at 66 and which has been illustrated as of a transparent type which retains an elastic characteristic after setting and which completely encloses all of the components of the circuit. The coil 62 is wound about a bow of relatively rigid material indicated at 67 and which is shaped so that it conforms to the configuration of the adjacent teeth. The actual dimensions of the transmitter mounted in this manner depend upon the sizes and arrangement of the components selected for the transmitter, and such components are available in sizes sufficiently small to provide a relatively comfortable fit for the user. The only exposed area of the unit is the active diaphragm portion of the microphone 58 which is subject to the pressure of the air within the mouth of the user.

Figure 14:
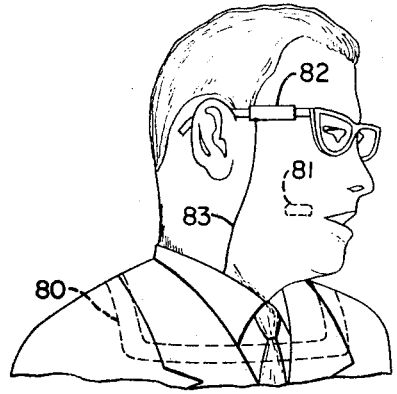
FIG. 14 is a perspective view representing a person fitted with a speech aid including a still further embodiment of the invention.

In FIG. 14 there is shown another embodiment of the invention wherein a loop antenna indicated at 80 is mounted over the shoulders of the user below his clothing where it is not in sight during use. The user has mounted within his mouth a small receiver, a converter and a transmitter unit 81 fabricated from miniature or micro size components of the type generally indicated above and which is carried on a denture or other suitable anchoring arrangement within the month of the user. A power supply and transmitter are connected to the antenna 80 and this radiates energy at a predetermined frequency which is picked up by the unit within the mouth and converted to another frequency which is applied to a second transmitter and radiated by means of a suitable antenna such as the small coils indicated in the embodiments above. The radiated signal at this frequency is modulated by the signals formed, for example, by a carbon button microphone like that of FIG. 7.

This radiated energy is picked up by a receiver mounted on the outside of the user's head on the temple of a pair of glasses or similar support 82 and the signal picked up in this manner is then conducted through a cable 83 to an audio amplifier and speaker in a manner similar to that employed in the previous embodiments of the invention.

Thus it will be understood that the energy for driving this system is first transmitted by radio to the receiver unit 82 where it is converted to a different frequency, is modulated by the sound signals, and is then transmitted to the speaker for conversion to sound. By employing this system it is not necessary to provide a battery on either of the units worn on the head of the speaker. By using two different frequencies possible interference with the audio signals is avoided.

Figure 15:
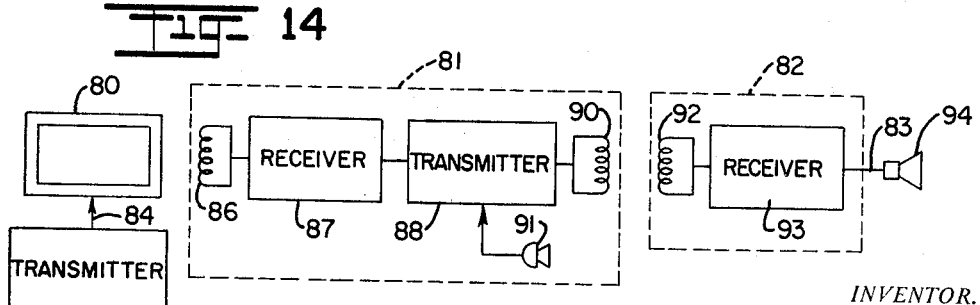
FIG. 15 is a circuit diagram of the system employed in the embodiment of FIG. 14.

The circuit employed with the system of FIG. 14 is illustrated diagrammatically in FIG. 15 wherein the antenna 80 is shown as connected to be energized through a conductor 84 by a transmitter 85. The transmitter 85 includes a power supply and circuits (not shown) to provide the required frequency and power of the carrier signal generated by the transmitter and fed to the antenna 80. The transmitter is carried on the person of the user in a suitable pocket or belt. The unit 81 includes a receiving antenna shown as a coil 86, a receiver 87 and a transmitter 88 energized by the receiver and arranged to produce a carrier wave at a different frequency from that of the antenna 80 and to impress it on a coil antenna indicated at 90.

The carrier wave produced by the transmitter 88 is modulated by operation of the microphone indicated at 91 and which is of a type such as that indicated at 47 in FIG. 7 for varying the resistance thereof in accordance with changes in air pressure. The modulated signal produced at the antenna 90 is picked up by a coil antenna 92 of a receiver 93 both included in the unit 82 mounted on the temple of the glasses worn by the user, and the demodulated signal is then transmitted through the cable or line 83 to a loud speaker indicated at 94. This loud speaker is located in a suitable position on the front of the wearer and may be concealed by the clothing.

It will be understood that all of the units may be constructed so that they are not damaged or deteriorated by mounting in the mouth of the user and in all forms a transducer is provided which is responsive to the pressure variations within the mouth, particularly those produced by the normal movement of the vocal organs required to generate speech sounds, and further that the quality of the sound produced at the loud speaker may be determined by the selection of tone shaping circuits in the receiver.

While the invention has been illustrated and described in connection with a number of different embodiments of components suitable for the practice of the invention, various other applications and modifications will occur to those skilled in the art. Therefore it is not desired that the invention be limited to the details of construction illustrated and described and it is intended by the appended claims to cover all modifications which fall within the spirit and scope of the invention.

I claim:

1. An apparatus for enabling a person who lacks vocal cords to generate articulate speech comprising a first electric circuit unit for mounting inside the mouth, a second electric circuit unit for mounting outside the mouth, power means connected in the circuit of one of said units for producing an electromagnetic field about both said units, a pressure sensing means on said first unit responsive to changes in the pressure of the air in the mouth, means on said first unit for utilizing said pressure sensing means for varying a characteristic of the flow of current in the circuit of said first unit in accordance with changes of pressure in the mouth to produce corresponding changes in said field, and means connected with said second unit for utilizing the changes in said field for producing audible sounds corresponding thereto.

2. An apparatus as set forth in claim 1 wherein said first electric circuit unit includes a power source connected in the circuit thereof.

3. An apparatus as set forth in claim 1 wherein said second electric circuit includes a power source connected therein.

4. An apparatus as set forth in claim 1 wherein said means for utilizing said pressure sensing means includes a variable inductance on said first unit and means for utilizing said pressure sensing means to vary the inductance thereof.

5. An apparatus as set forth in claim 1 wherein said means for utilizing said pressure sensing means includes a variable capacitor on said first unit and means for utilizing said pressure sensing means to vary the capacitance thereof.

6. An apparatus as set forth in claim 1 wherein said means for utilizing said pressure sensing means includes a variable resistor on said first unit and means for utilizing said pressure sensing means to vary the resistance thereof.

7. An apparatus as set forth in claim 1 wherein said first electric circuit comprises inductance and capacitance and is tuned to a predetermined frequency and wherein said second electric circuit comprises an inductance and capacitance and is tuned to the same frequency as said first circuit and wherein said utilizing means connected to said second unit includes an oscillator of the grid dip meter type and an amplifier and speaker energized thereby.

8. An apparatus as set forth in claim 1 wherein said means for utilizing the changes in said field for producing audible sounds includes a superheterodyne receiver and an audio amplifier and speaker energized thereby and wherein said first unit comprises a capacitor and an inductance and a carbon microphone connected in series, said carbon microphone constituting said pressure sensitive means, and wherein said second unit comprises a pickup coil connected to energize said superheterodyne receiver and wherein said first unit is tuned to a predetermined frequency and said pickup coil together with the capacitance of the receiver circuit connected therewith is tuned to the same frequency.

9. The method of generating articulate speech without the use of vocal cords which comprises
- producing air pressure changes by the normal speech producing movements of the speech generating structure of the lips and oral cavity,
- producing an electromagnetic field extending inside and outside the mouth,
- producing within the mouth an electric current varying in accordance with the pressure changes,
- varying the field in accordance with said varying electric current, and
- utilizing the variations in said field outside the mouth for generating audible signals corresponding to said pressure changes.

References Cited

UNITED STATES PATENTS

| | | |
|---|---|---|
| 3,084,221 | 4/1963 | Cooper et al. |
| 2,868,876 | 1/1959 | Ticchioni. |
| 2,273,078 | 2/1942 | Wright. |
| 2,862,209 | 12/1958 | Cooper. |

FOREIGN PATENTS 145,624  6/1962  U.S.S.R.

KATHLEEN CLAFFY, Primary Examiner

C. JIRAUCH, Assistant Examiner

U.S. Cl. X.R.

3—1.3